(12) United States Patent
Madukkarumukumana et al.

(10) Patent No.: US 8,706,942 B2
(45) Date of Patent: Apr. 22, 2014

(54) DIRECT MEMORY ACCESS (DMA) ADDRESS TRANSLATION BETWEEN PEER-TO-PEER INPUT/OUTPUT (I/O) DEVICES

(75) Inventors: Rajesh Madukkarumukumana, Portland, OR (US); James A. Sutton, II, Portland, OR (US); Ioannis Schoinas, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 11/026,314

(22) Filed: Dec. 29, 2004

(65) Prior Publication Data

US 2006/0143311 A1  Jun. 29, 2006

(51) Int. Cl.
G06F 13/36  (2006.01)

(52) U.S. Cl.
USPC .......................................... 710/306; 710/314

(58) Field of Classification Search
USPC ................................................ 710/306, 314
See application file for complete search history.

(56) References Cited

U.S. PATENT DOCUMENTS

| | | | |
|---|---|---|---|
| 5,913,045 A * | 6/1999 | Gillespie et al. | 710/311 |
| 5,961,581 A * | 10/1999 | Muthusamy | 708/670 |
| 6,012,120 A | 1/2000 | Duncan et al. | |
| 6,049,857 A * | 4/2000 | Watkins | 711/207 |
| 6,128,684 A * | 10/2000 | Okayama | 710/109 |
| 6,581,130 B1 * | 6/2003 | Brinkmann et al. | 710/306 |
| 6,715,023 B1 * | 3/2004 | Abu-Lebdeh et al. | 710/317 |
| 6,725,289 B1 * | 4/2004 | Waldspurger et al. | 710/9 |
| 6,886,171 B2 * | 4/2005 | MacLeod | 719/324 |
| 7,096,305 B2 * | 8/2006 | Moll | 710/312 |
| 7,475,166 B2 * | 1/2009 | Arndt et al. | 710/23 |
| 7,505,460 B2 * | 3/2009 | Bell | 370/389 |
| 2003/0135685 A1 * | 7/2003 | Cowan | 710/308 |
| 2004/0039986 A1 * | 2/2004 | Solomon et al. | 714/799 |
| 2004/0098591 A1 * | 5/2004 | Fahrny | 713/176 |
| 2004/0193919 A1 * | 9/2004 | Dabbish et al. | 713/201 |
| 2004/0205253 A1 * | 10/2004 | Arndt et al. | 710/1 |
| 2005/0125548 A1 * | 6/2005 | England et al. | 709/229 |
| 2005/0132365 A1 | 6/2005 | Madukkarumukumana et al. | |
| 2005/0165783 A1 * | 7/2005 | Hyser | 707/9 |
| 2005/0207407 A1 * | 9/2005 | Baumberger | 370/389 |
| 2006/0005184 A1 | 1/2006 | Tewari et al. | |
| 2006/0021029 A1 | 1/2006 | Brickell et al. | |
| 2006/0069899 A1 | 3/2006 | Schoinas et al. | |
| 2006/0075146 A1 | 4/2006 | Schoinas et al. | |

(Continued)

OTHER PUBLICATIONS

U.S. Appl. No. 11/157,675, filed Jun. 21, 2005, Sankaran, et al.

(Continued)

*Primary Examiner* — Nimesh G Patel
(74) *Attorney, Agent, or Firm* — Blakely, Sokoloff, Taylor & Zafman LLP (57) ABSTRACT

A method and apparatus is described herein for supporting direct memory accesses between peer I/O devices. It is determined whether a guest physical address (GPA) referenced by an access generated from an I/O device, is within a range of GPAs associated with local I/O devices based at least in part on a GPA base and a GPA window size. If the GPA is within the window, then the GPA is translated to an HPA based at least in part on a base HPA associated with a local device and then forwarded to that local device. However, if the GPA is not within the window, then the access is forwarded upstream.

15 Claims, 7 Drawing Sheets

(56) References Cited

U.S. PATENT DOCUMENTS

| | | | |
|---|---|---|---|
| 2006/0075147 A1* | 4/2006 | Schoinas et al. | 710/3 |
| 2006/0075285 A1 | 4/2006 | Madukkarumukumana et al. | |
| 2006/0130060 A1 | 6/2006 | Anderson et al. | |
| 2006/0136910 A1 | 6/2006 | Brickell et al. | |
| 2006/0161719 A1 | 7/2006 | Bennett et al. | |
| 2006/0195674 A1* | 8/2006 | Arndt et al. | 711/173 |
| 2007/0143395 A1* | 6/2007 | Uehara et al. | 709/203 |

OTHER PUBLICATIONS

Office Action for U.S. Appl. No. 12/653,989 mailed Mar. 3, 2011, pp. 9.

\* cited by examiner

DIRECT MEMORY ACCESS (DMA) ADDRESS TRANSLATION BETWEEN PEER-TO-PEER INPUT/OUTPUT (I/O) DEVICES

FIELD

This invention relates to the field of processors and, in particular, to accesses between input/output devices.

BACKGROUND

As processing resources have increased, demands to run multiple software programs and operating systems on a single microprocessor have also increased. To meet these demands virtual environments have been developed to allocate a single computer system's resources to various software application and operating systems. Typically, in a virtual environment, a virtual machine monitor (VMM) program interfaces with one or more software programs, such as a virtual machine (VM) program, and hardware resources available in a computer system. A VM may include guest software, such as an operating system (OS) or other software applications. Usually, to allow multiple VMs to run on a single processor the state information and control information for the VMM and each VM program is stored in memory.

Figure 1A:
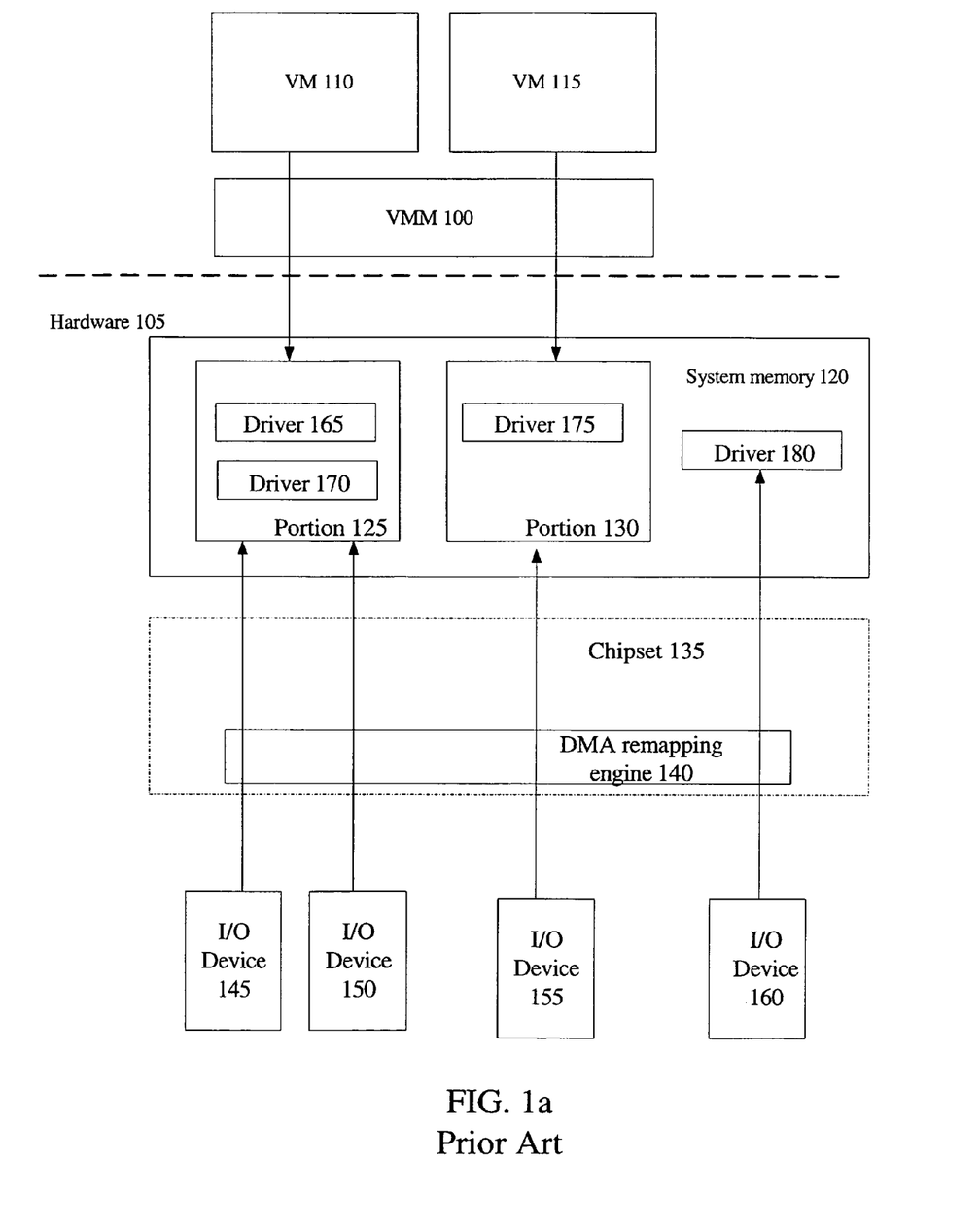
FIG. 1a illustrates a prior art embodiment of virtualization.

One technique of virtualization ensures security between multiple VMs running on a single platform by assigning each VM an isolated portion of memory, which is also referred to as a domain or container. An illustration of this type of virtualization is shown in FIG. 1a. Virtual machine monitor (VMM) 100 interfaces with VM 110 and VM 115, also referred to as guest software, as well as underlying physical hardware 105. As explained above, VM 110 is assigned to domain 125 in and VM 115 is assigned to domain 130 in system memory 120. VMM 100 may also be assigned a domain within system memory 120. In one implementation, accesses from I/O devices 145, 150, 155, and 160 are trapped by VMM 100 to ensure unauthorized accesses by the I/O devices are not made. However, this requires all accesses by I/O devices to be trapped by the VMM, emulated, and the submitted to the underlying physical device hardware 105, which introduces potential delays.

In another implementation, I/O devices 145-160 are assigned or associated with domains or portions of memory by direct memory access (DMA) remapping engine 140, as illustrated in FIG. 1a. DMA remapping engine may be present in chipset 135, which is often distributed among multiple integrated circuits and controller hubs. DMA remapping engine 140 is capable of translating between guest physical addresses, the logical view of an address space from the guest software or device's perspective, and host physical addresses, the actual address space of underlying hardware 105. The term guest physical address is commonly used in an environment utilizing virtualization. However, it is apparent that the term guest physical address is a form of a device virtual address (DVA), where the DVA space is the device's or guest software's view of a physical address space.

I/O device 145 and 150 are mapped/assigned to domain 125, I/O device 155 is assigned to domain 130, and I/O device 160 is assigned to a shared portion of system memory 120. Device drivers 165, 170, 175, and 180 corresponding to I/O devices 145, 150, 155, and 160, respectively, are present in domains assigned to each of the I/O devices. Therefore, each I/O device may potentially access system memory 120 directly without emulation by the VMM 100. DMA remapping is discussed in more detail in co-pending application with Ser. No. 10/956,198 entitled, "Address Translation for Input/Output Devices using Hierarchical Translation Tables."

Figure 1B:
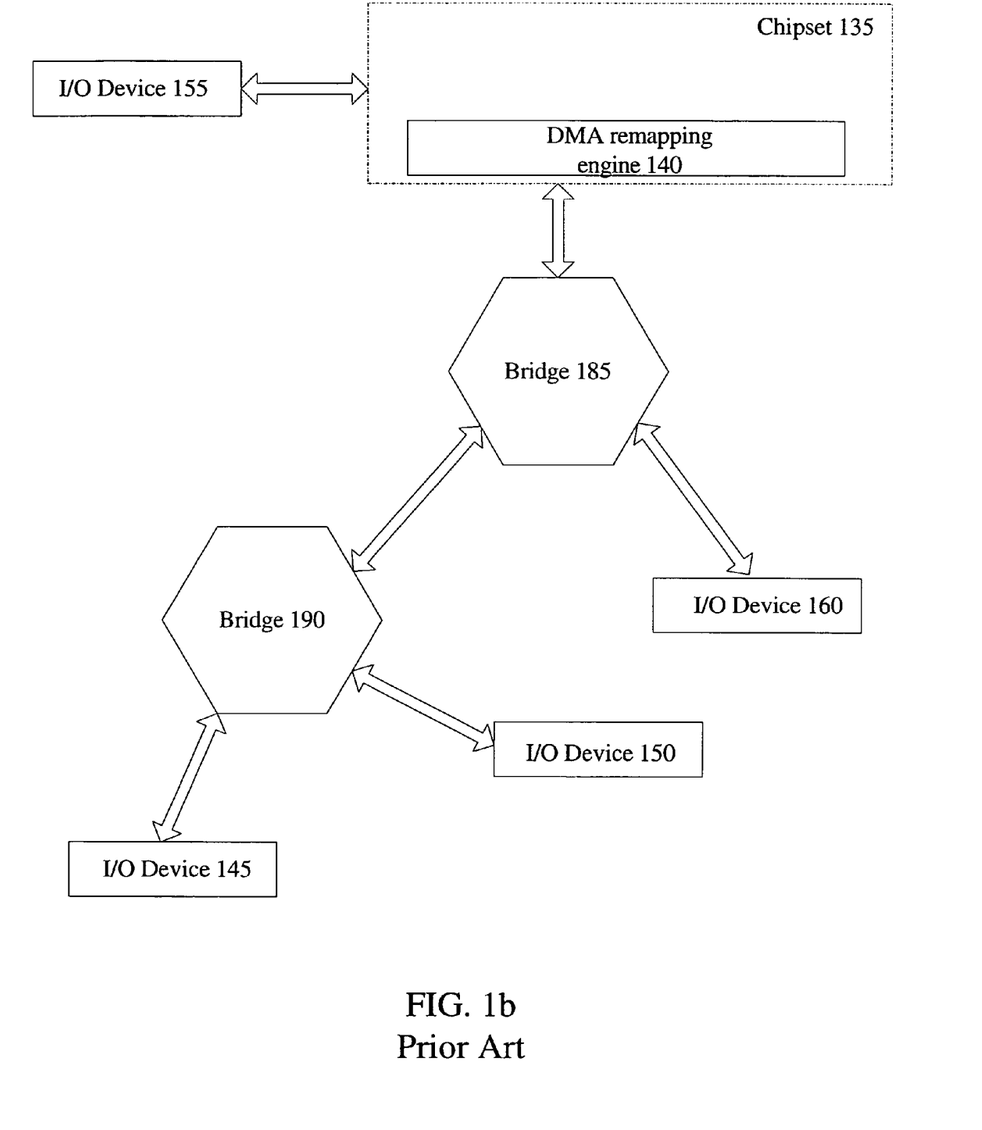
FIG. 1b illustrates a prior art embodiment of a typical hierarchal organization of I/O devices.

A typical hierarchal structure of I/O devices 145-160 are shown in FIG. 1b. I/O device 155 and bridge, also referred to as a switch, 185 is locally coupled to chipset 135. I/O device 160 and bridge 190 is locally coupled to bridge 185. Locally coupled to bridge 190 is I/O devices 145 and 150. As noted above, device 145 and device 150 are also assigned to the same domain, domain 125. However, when a memory request or access meant for I/O device 150 is initiated by I/O device 145, the access is typically blindly forwarded upstream towards DMA engine 140. DMA engine 140 translates the address. If the translated address is a peer-to-peer request, as in this example, the access is sent back downstream to the appropriate destination, which is I/O device 150.

Therefore, accesses among peer I/O devices, which may be coupled locally to the same bridge or coupled in the hierarchal structure, are sent all the way upstream and either remapped or trapped by the VMM limiting the potential performance of peer-to-peer accesses.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as specific virtual machines, logic placement, and device hierarchy in order to provide a thorough understanding of the present invention. It will be apparent, however, to one skilled in the art that these specific details need not be employed to practice the present invention. In other instances, well known components or methods, such well-known functional blocks of a computer system, a primary DMA remapping engine, etc., have not been described in detail in order to avoid unnecessarily obscuring the present invention.

A method and apparatus for supporting peer-to-peer I/O device accesses is described herein. As discussed below, the method and apparatus described will be discussed in specific reference to a virtual environment. However, the method and apparatus described herein is not so limited.

FIG. 1 illustrates an embodiment of a computer system that supports peer-to-peer input/output (I/O) device accesses. Computer system 200 may be a single or multiple processor system capable of operating in a virtual machine environment; however, computer system 200 is not so limited.

Figure 2:
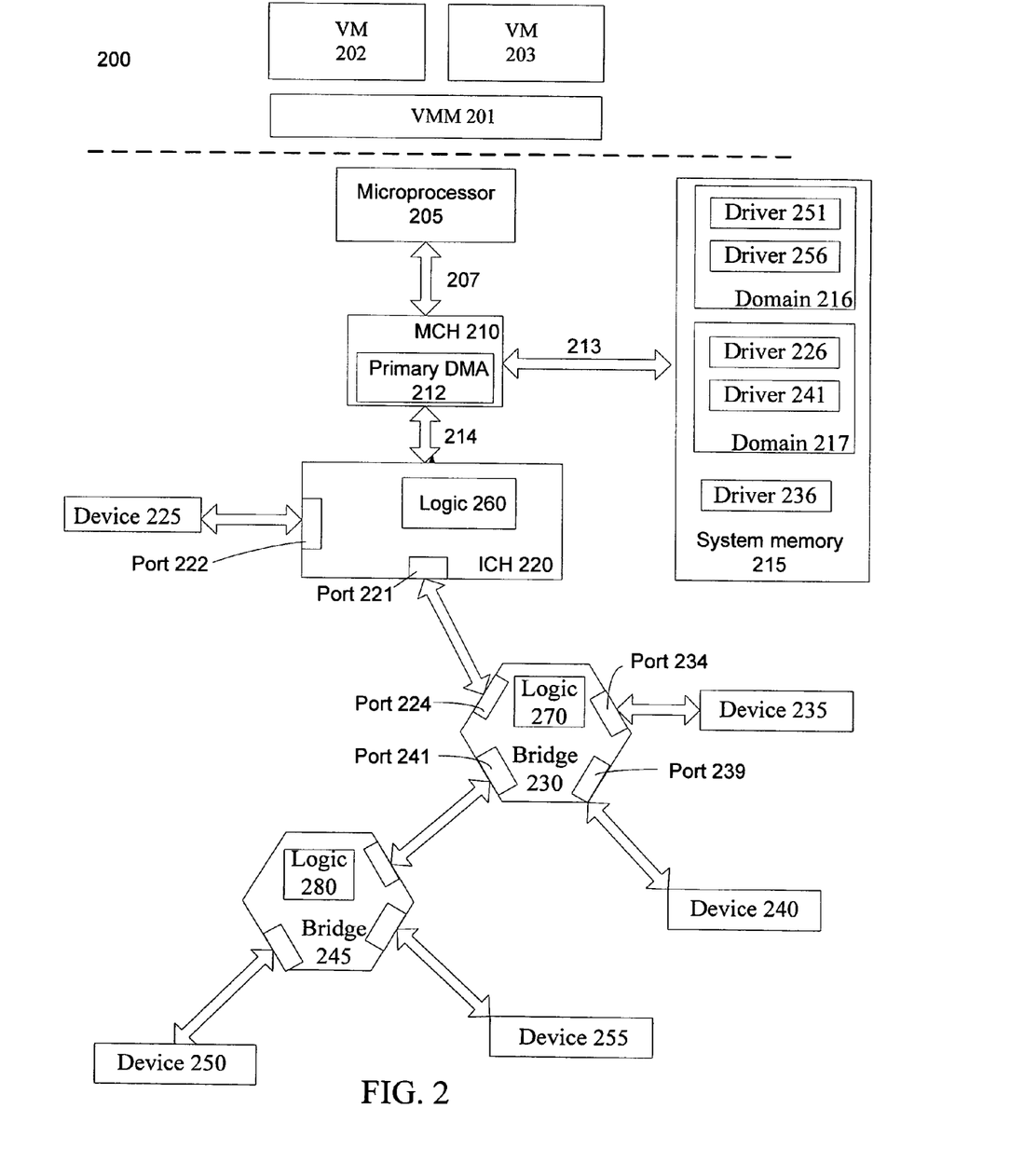
FIG. 2 illustrates an embodiment of a computer system supporting peer-to-peer direct memory address accesses.

FIG. 2 illustrates an embodiment of a computer system that supports peer-to-peer input/output (I/O) device accesses. Computer system 200 may be a single or multiple processor system capable of operating in a virtual machine environment; however, computer system 200 is not so limited.

Figure 3A:
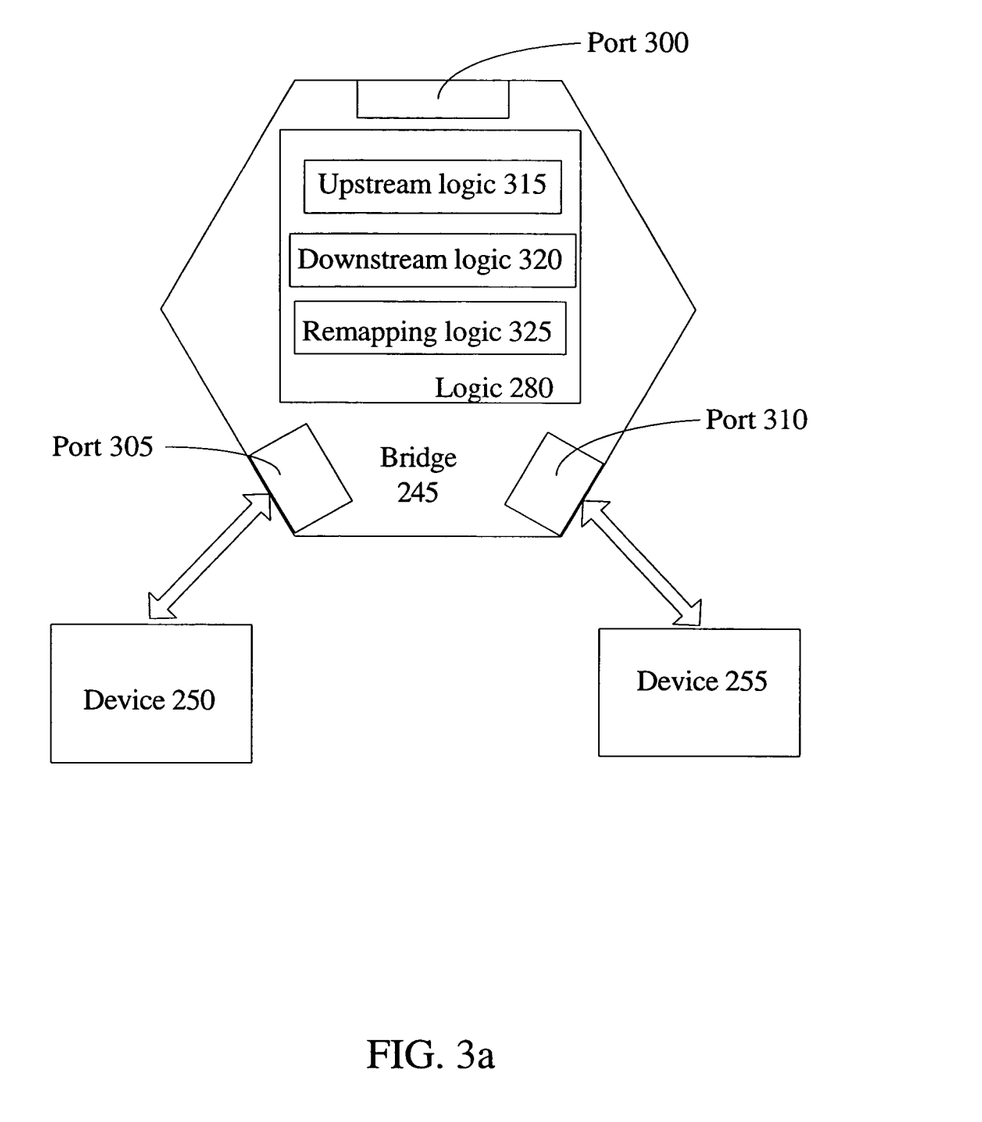
FIG. 3a illustrates an embodiment of a bridge from FIG. 2.

Turning to FIG. 3a, the operation of bridge 245 and translation logic 280 will be discussed in more detail. Although bridge 245, which includes translation logic 280, is specifically discussed, the following discussion also relates to bridge 230, which includes logic 270 and ICH 200, which includes logic 260. As illustrated in FIG. 3a, bridge 245 has ports 300, 305, and 310 for coupling of I/O devices. In one embodiment, any single or plurality of the ports is/are operable to connect to ICH 220, as well as another bridge or switch. In FIG. 3a, port 300 is coupled to bridge 230, as shown in FIG. 2. Remapping logic 240 comprises upstream logic 315, downstream logic 320, and remapping logic 325.

Microprocessor 205 is coupled to memory controller hub (MCH) 210 through interconnect 207. Interconnect 207 is typically a front-side-bus (FSB). In one embodiment, interconnect 207 is a common standard interface (CSI) bus that implements CSI protocols. MCH 210 interfaces with system memory 215 through memory bus 213. In addition, MCH 210 has primary direct memory access (DMA) remapping engine 212, which will be discussed in more detail below. MCH is coupled to interconnect controller hub (ICH) 220, also referred to as an input/output hub (IOH), through interconnect 214. Often the combination of MCH 210 and ICH 220 is referred to as a chipset.

System memory 215 may be any type of access memory used in a system. In one embodiment, system memory 215 is a random access memory (RAM) device such as a static random access memory (SRAM), a dynamic random access memory (DRAM), a single data rate (SDR) RAM, a double data rate (DDR) RAM, any other multiple data rate RAM, or any other type of access memory.

As illustrated, computer system 200 includes virtual machine monitor (VMM) 201 to interface guest software, also known as a virtual machine (VM) or a virtual machine program, with underlying hardware, such as microprocessor 205 and system memory 215. VMM 201 may be implemented in software, hardware, firmware, or any combination of software, hardware and firmware. As an example, VMM 201 is assigned, not shown, to a portion of system memory 215. VMM 201 usually has a high-level privilege allowing guest software, i.e. virtual machines (VMs), to interface with underlying hardware. As an example, there is a single VMM to interface multiple VMs with hardware. In an alternate implementation, there are a plurality of VMMs organized in any manner. For example, a first VMM interfaces all of the network related VMs, while a second VMM interfaces all of the storage related VMs.

Specifically, FIG. 2 depicts a first virtual machine 202 and a second virtual machine 203. Virtual machines 202 and 203 may be any one of or any combination of the following: an operating system, an operating system specific application, a general application, software routines, a group of related applications, a group of related drivers, related code, or any other program that may be executed on microprocessor 205. As a specific example, VM 202 is a Windows operating system and VM 203 is a Linux operating system. In another embodiment, VM 202 includes all of the input/output (I/O) device drivers for network devices, while VM 203 includes all of the I/O device drivers for storage devices.

VMs 202 and 203 are assigned to portions of system memory 215; specifically, domain 216 and domain 217. Typically portions of memory assigned to VMs or VMMs are called domains or containers. Isolation and security between domain 216 and 217 is typically enforced by VMM 201. However, as discussed below, primary DMA remapping engine 212, as well as other hardware and software is also used to ensure security among domains 216 and 217.

Also illustrated in FIG. 2 are I/O devices 225, 235, 240, 250, and 255. An I/O device is usually any device for interfacing or communicating with devices or users external to a computer system, as well as devices, such as switches, bridges, and controller hubs used to couple I/O devices to a computer system. Examples of I/O devices include network interface controllers (NICs), other network devices, audio devices, video controllers, video capture devices, TV tuner devices, mass storage devices, short-term storage devices, other storage devices, serial devices, wireless devices, local peripheral component interconnect (PCI) devices, PCI switches, PCI bridges, peripheral component interconnect express (PCI-X) devices, PCI-X bridges, and PCI-X switches.

A peer-to-peer access includes any access between the aforementioned I/O devices. A few limited examples of types of peer-to-peer accesses include console re-direction (including peer to peer accesses to keyboard and video frame buffers), I/O processing (including peer accesses from I/O processors to adapters such as for RAID acceleration), client usages such as video capture and picture-in-preview (including peer accesses between graphics and video capture devices).

I/O devices 225, 235, 240, 250, and 255, herein referred to as devices 225-255, may be arranged in any manner. In one embodiment, as illustrated in FIG. 2, devices 225-255 are coupled in a hierarchical manner. At the first local level, I/O device 225 and bridge/switch 230 is coupled to ICH 220. At the second local level, I/O device 235, I/O device 240, and Bridge 245 are coupled locally to bridge 230. At the third local level, I/O device 250 and 255 are coupled locally to bridge 245. Devices 225-255 are coupled to a controller hub, such as ICH 220, using a peripheral interconnect bus. In one embodiment, a PCI bus is used to connect devices 225-255 to computer system 200. As another example, a PCI-X bus is used to coupled devices 225-255 to computer system 200.

As used herein, the term upstream, refers to a direction up the hierarchy of connection, i.e. towards a primary remapping engine for translating guest addresses to host addresses for accesses to system memory. As an example, bridge 230 forwarding an access upstream would be forwarding the access to ICH 220, which is at the first level of the hierarchy, in the example above, as well as being between bridge 230 and primary remapping engine 212/system memory 215. Inversely, downstream, as used herein refers to a direction down the hierarchy of coupling, i.e. away from a primary remapping engine/system memory. From the example above, forwarding downstream from bridge 230 would include forwarding an access to bridge 245, which is the third level of hierarchy, as well as a direction away from primary DMA engine 212 and system memory 215.

Every memory location within system memory 215 has an associated physical memory address, also referred to host physical memory address. As guest software or VMs typically view a domain assigned to it as a contiguous address space, guest software logically views a domain's address spaces as a device virtual address (DVA) space, also referred to as a guest physical address (GPA) space. Therefore, the resources assigned or associated with each domain, such as domain 216 and domain 217, may have a different view of physical memory than the system's view of physical memory.

As a simplified example, system memory 215 has host physical addresses (HPAs) 0 to 10,000. In this example, domain 216 includes HPAs 1000 to 2000. However, I/O device 250 and driver 251 assigned to domain 216 logically view domain 216 as having GPAs 0 to 1000. Consequently, when referencing GPA 0, the actually physical memory location has HPA of 1000. In this instance, where a domain's guest physical address space is translated to achieve the host physical address space, the domain is referred to as a relocated domain. However, when a domain's guest physical address space is the same as, or a subset of, the system's host physical address space the domain is referred to as a non-relocated domain. A GPA space or HPA space does not have to be contiguous. As an example, an HPA space includes a plurality of non-contiguous windows logically viewed by guest devices as a contiguous address space.

Primary DMA engine 212, herein referred to as engine 212, illustrated in MCH 210 is capable of logically assigning/mapping I/O devices 225, 235, 240, 250, and 255 to domains in system memory 215. As an example, I/O devices 250 and 255 are mapped to domain 216, I/O devices 225 and 240 are mapped to domain 217, and I/O device 235 is mapped to a shared portion of system memory 215. Engine 212 is not limited to being located in MCH 210, and in fact, may be placed anywhere between devices 225-255 and system memory 215.

Engine 212 filters accesses to system memory, as well as includes logic to translate accesses to system memory from the guest physical addresses (GPAs) to host physical addresses (HPAs). To ensure security between the domains, engine 212 may allow accesses from specific devices to access certain ranges/windows of memory, not allowing access to other ranges/windows. Primary DMA engine and translation of system memory accesses from GPAs to HPAs is discussed in more detail in co-pending application with Ser. No. 10/956,198 entitled, "Address Translation for Input/Output Devices using Hierarchical Translation Tables."

Also illustrated is secondary DMA translation logic 260, 270 and 280 in ICH 260, bridge 230, and bridge 245, respectively. Secondary translation logic is also referred to as secondary remapping engine, remapping logic, translation logic, or other variance of logic to remap guest addresses to host addresses. As an example, remapping logic 260 remaps a first address, such as a guest address, referenced by an access received by ICH 220, to a second address, such as a host address, if the first address is within a window or range of addresses associated with I/O device 225. However, if the first address is not within the window of addresses associated with I/O device 225, then the access is forwarded upstream to MCH 210.

Turning to FIG. 3a, the operation of bridge 245 and translation logic 280 will be discussed in more detail. Although bridge 245 and translation logic 280 is specifically discussed, the discussion relates to bridge 230 having logic 270 and ICH 200 having logic 260. As illustrated in FIG. 3a, bridge 245 has ports 300, 305, and 310 to couple I/O devices to. In one embodiment, any single or plurality of the ports is/are operable to connect to ICH 220, as well as another bridge or switch. In FIG. 3a, port 300 is coupled to bridge 230, shown in FIG. 2. Remapping logic 240 comprises upstream logic 315, downstream logic 320, and remapping logic 325.

In one embodiment, upstream accesses, i.e. accesses generated from an I/O device, such as I/O devices 250 and 255, reference a guest address. Inversely, downstream accesses, i.e. accesses flowing downstream to access an I/O device reference a host address. As one example, an I/O device driver present in system memory and executed on the microprocessor generates a downstream access to access an I/O device, such as I/O device 250. This downstream access either initially references or is translated into a host address.

Downstream logic 320 in bridge 245 associates a range or window of host addresses with each I/O device coupled to bridge 245 through ports 305 and 310. For example, downstream logic 320 may associate host addresses 0 to 500 with device 250 and 501 to 1000 with device 255. Consequently, if a downstream access references host address with a value of 300, then the access is forwarded to device 250 being in the range of 0 to 500. As another more specific example, I/O device 250 is another bridge having 2 devices associated with host addresses 0-500 and 501-1000, respectively, and I/O device 255 is a network interface controller associated with host addresses 1001-1500. Then, downstream logic 320 associates host addresses 0-1000 with port 305, the port bridge 250 is coupled to, and addresses 1001-1500 with port 310, the port network interface controller 255 is coupled to. Downstream logic 320 is not discussed in detail, as it is well-known in the art.

An I/O device, such as device 250 may also generate a memory request/access, which is meant for system memory or a peer I/O device. In prior art implementations described above, since the access references a guest physical address, it is forwarded upstream to a primary DMA remapping engine. Once at the primary DMA remapping engine, the guest address referenced by the access is translated to a host address. If the host address indicates a peer I/O access, the access is forwarded back downstream. This potentially limits I/O device to I/O device transfer rates.

Upstream logic 315 associates a window or range of guest addresses for each I/O device coupled to bridge 245. Therefore, from the example above, if I/O device 205 generates an access referencing a guest physical address, which if translated to the corresponding host physical address, is associated with device 255, then the guest physical address is translated/remapped and forwarded to device 255, without forwarding the access all the way upstream and back down.

In one embodiment, upstream logic 320 comprises at least one register, but potentially a plurality of registers, to store a source identifier (ID) to identify a source of an access, a guest address base to establish a base for an associated window of guest addresses, a size of the associated window of guest addresses, and a base for an associated host address.

For example, device 250 and 255 are local devices to each other being coupled to bridge 245 at the same hierarchal level. Consequently, a context register in upstream logic 320 associates a window or a plurality of ranges of guest addresses associated with device 255, i.e. guest addresses that if translated would be in a range of host addresses that would be forwarded to device 255. The context register stores a source ID to represent device 250, a base guest address to establish the base of the window of guest addresses associated with device 255, a size of the guest window, and the host address base for device 255.

To continue the example with extremely simplified numbers, assume that device 255 is associated with host addresses 1000-1500 and the guest addresses corresponding to those host addresses are 0-500. First, an access generated by device 250 referencing guest address 100 is received on port 305. The source id representing device 250 is matched in a context register in upstream logic 320. The guest window size associated with local device 255 is determined based at least in part on the stored guest base and guest size. In this case, the guest size of 500 is added to a stored base of 0 to establish the guest window of 0-500. Since the referenced guest address is within the window, the guest address in remapping logic 325 is remapped/translated to a host address based at least in part on the stored base host address. Here, the offset of the guest address from the stored guest base, (100-0), is added to the stored host base address of 1000 to establish the host address of 100. Being between the host address 1000-1500 associated with device 255, the access is then forwarded to device 255.

Upstream logic 315 and downstream logic 320 may be written to upon initialization to establish the stored values, such as the source IDs, base address, sizes, and other information. Additionally, both may be written to during execution of a VMM or VM. Moreover, as a new input/output device is connected the stored values may either be dynamically updated at that point or statically updated later upon an event, such as restart, power-on, or some other execution event.

Figure 3B:
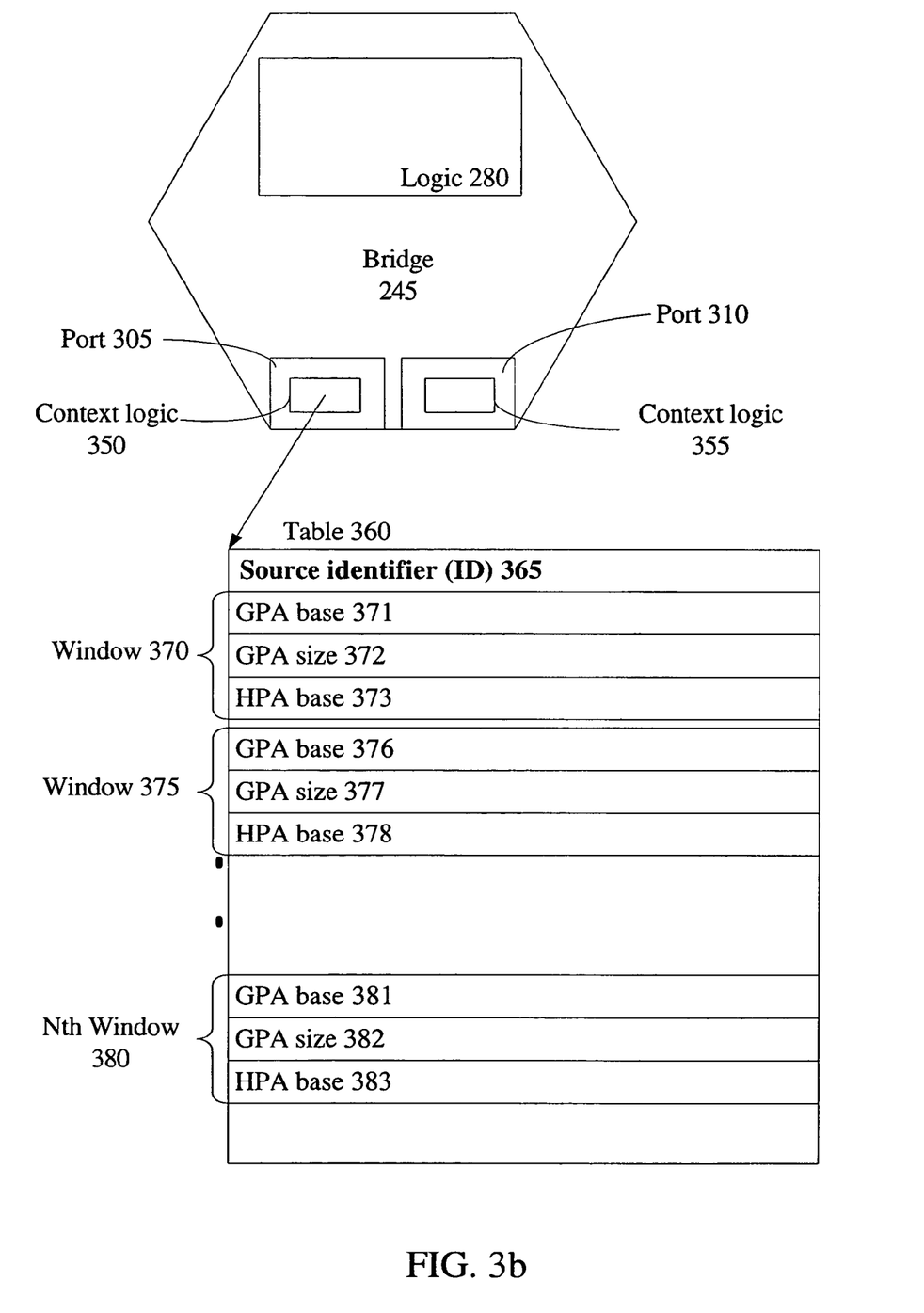
FIG. 3b illustrates an embodiment of a bridge from FIG. 2.

Turning to FIG. 3b, another embodiment of placing logic 280 in bridge 245 is shown. Instead of centralizing the logic 280 in bridge 245, logic 280 may be distributed throughout bridge 245, including within ports 305 and 310. In this embodiment, context logic 350 and 355, discussed above in reference to upstream logic 315, are present in ports 305 and 310, respectively. In one embodiment, context logic 350 and 355 comprises a plurality of context registers. As a specific example, context logic 350 and context logic 355 comprises a context register for every port on bridge 245, except for the port the context register is present in. Therefore, if there are N I/O devices or N ports on bridge 245, there are N−1 context registers. In another embodiment, context logic 350 and 355 comprises table logic for storing a table indexed by a source ID.

An example of context register 350's contents is shown in table 360. Table 360 comprises a source ID 365. From the example above, when identifying an access or memory request from device 250, source ID 365 stores a source ID that represents device 250. Table 360 also comprises guest physical address windows/ranges 370, 375, and 380. Context register 350 may store any number of windows or ranges to be associated with another device, such as device 255. In a specific embodiment, context register 350 stores up to six ranges. Each window, such as window2 370, stores a guest physical address (GPA) base, such as GPA base 371, guest physical address (GPA) window size, such as GPA size 372, and a host physical address (HPA) base, such as HPA base 373. For example, if device 250 generates an access referencing a GPA, then it is determined if the GPA is within window 370, window 375, or window 380. If the GPA is within window 370, window 375, or window 380, then the GPA is translated to an HPA based at least in part on the GPA, the GPA base address, or the HPA base address. Translation logic or remapping logic may be present in port 350 and 355, distributed between port 350, 355, and other logic within bridge 245, or present in other logic associated with bridge 245.

Above, examples were given of a specific implementation of bridge 245 with accesses received by and generated from I/O devices 250 and 255. However, the apparatus and method described herein are not so limited. In fact, any integrated circuit having an I/O device coupled to it within computer system 200 may implement the apparatus and method described herein. Consequently, to demonstrate a broader implementation another example in reference to FIG. 2 is discussed immediately below. GPAs and HPAs as discussed above and below are extremely simplified examples illustrating different GPAs and HPAs using numerals, such as 1000 or 10,000. However, GPAs and HPAs may be the same values, a subset of values, or differently offsetting values, as well as being represented by binary values, hexadecimal values, logical values, or other values representative of addresses and memory locations.

In this example, referring to FIG. 2, I/O device 240, which is assigned to domain 217, generates an access referencing a guest address, 1400, associated with device 225, which is also assigned to domain 217 but coupled to ICH 220. It is assumed that initialization or other method of storing source IDs, GPA bases, GPA sizes, and HPA bases have been completed. It is further assumed that device 225 is associated with a GPA window of 1000-2000 and a HPA window of 5500-6500, while device 235, 250, and 255 are not associated with GPA window 1000-2000.

Bridge 230 receives the access on port 239. Logic 270 in bridge 230, which may include but is not required to include context registers in port 239 or context table logic, determines the source of the access as device 240, by matching a source ID representing device 240 to a source ID stored in the context logic. A GPA window is determined for values stored in context logic with source ID representing 240. In this example, a guest window for device 235 is determined, which is assumed to be 20,000-21,000 having a GPA base of 20,000 and a GPA window size of 1,000. Optionally, context logic may also include GPA windows for downstream devices, such as device 250 and 255. However, as to not obscure this example, those devices will not be specifically discussed.

Therefore, since the access references GPA 1400, assuming that is not associated with devices 235, 250, and 255, then the access is forwarded upstream to ICH 220. ICH 220 receives the access on port 221 and performs similar functions with logic 260 as logic 280 performed in bridge 230, which include matching the source ID, determining a GPA window based at least in part on a stored GPA base and GPA size. Here, the GPA base is 1000 and the GPA size is 1000, so the GPA window is 1000-2000. GPA 1400 is within the GPA range; therefore, GPA 1400 is translated to an HPA based at least in part on a stored base HPA. Here, the stored HPA base is 5500, representing the base HPA address associated with device 225. An offset of 400 is determined from the offset of GPA 1400 from GPA base of 1000. The offset of 400 is added to the base of 5500 to establish a HPA of 5900. Since this is in the range of HPA's associated with device 225, the access is forwarded/routed to device 225.

As can be seen from this example, the peer-to-peer access between I/O device 240 and 225 is not a "local" access, as device 225 and device 240 are not locally coupled to the same bridge. However, the guest address of 1400 does not have to be routed to primary DMA engine 212, translated, and then routed back downstream to device 225. Rather, the access is able to forward to the peer I/O device.

Additionally, a translation field may be included to indicate when a translation has occurred. For example, when ICH 220, at port 221, translates the guest address, also referred to as a device virtual address, to a host address, the translation field is updated to represent the address has been translated. This allows for logic 260 to avoid attempting primary translation on an already translated address. The translation field may be extended to the bridges as well. As an example, if bridge 230 translated the guest address and then forwarded it to port 221, the translation field is used to indicate the translation has already been done and the access/request need only be forwarded to device 225, instead of translated. A translation field may be implemented in numerous different ways. In one embodiment, the translation field is a portion of an address, where the portion has a first value when untranslated and a second value when translated. In another embodiment, the translation field is in a protocol header for used for the peripheral bus.

Furthermore, the logic in a bridge, such as logic 280 in bridge 245 may be enabled and disabled. When enabled, logic 280 performs operations as in the examples and embodiments discussed above. Moreover, when disabled, logic 280 or other logic in bridge 245 may "blindly" forward the access upstream. Therefore, some bridges/switches may have translation logic enabled, while others have translation logic disabled. Or, translation logic in the bridges may be all disabled, as well as all enabled. As an example, logic 280 is enabled and disabled by software. Software, a VMM, or VM enables logic 280 after determining that hardware, such as the I/O devices, are trusted. This allows for the logic to be disabled, by the software, when an I/O device is not trusted to prevent malicious programming to be able to directly access peer I/O devices.

Figure 4:
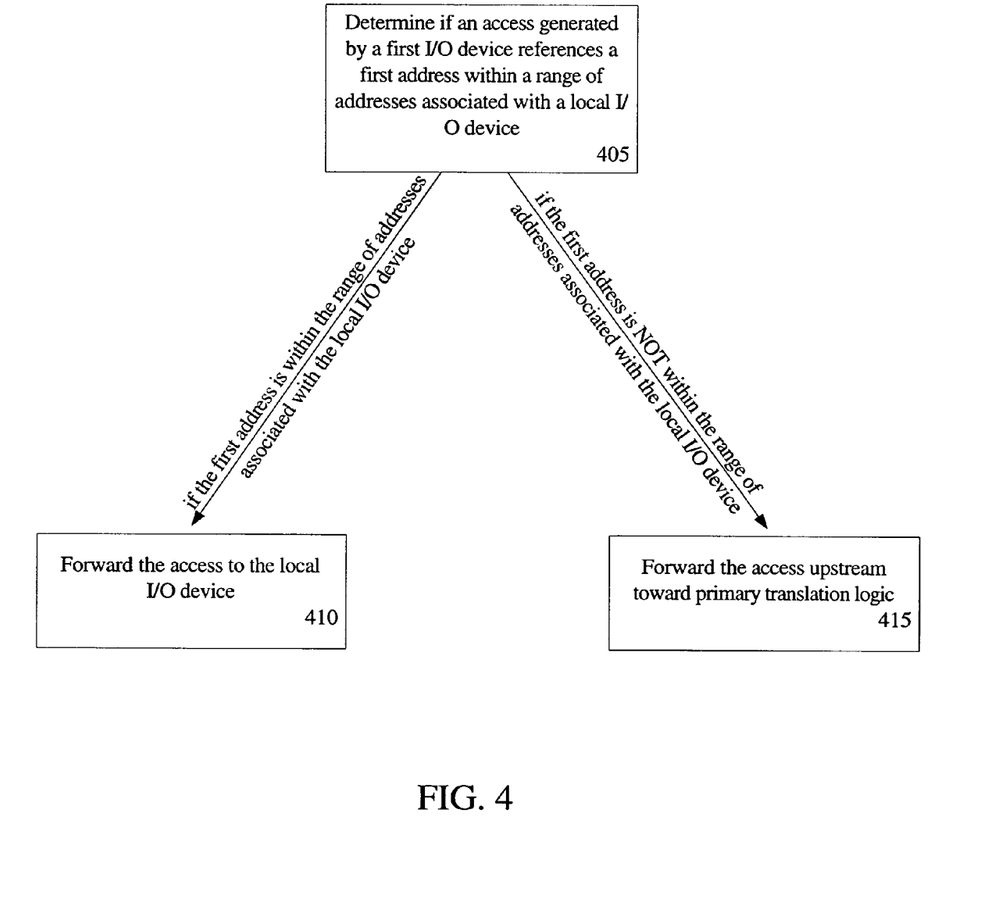
FIG. 4 illustrates an embodiment of a method for supporting direct memory accesses between peer I/O devices.

Referring next to FIG. 4, an embodiment of a method for supporting direct memory accesses between I/O devices is illustrated. In block 405, it is determined if an access generated by a first I/O device references a first address within a range of addresses associated with a local I/O device. In one embodiment, as discussed above, a range of addresses associated with a local I/O device includes determining the range of addresses associated with the local I/O device by adding a stored size to a stored base address associated with the local I/O device. As a specific example, the first address is a guest physical address (GPA) and the stored base address references a stored base GPA. As described above, the bounds of the range/window may be obtained by adding the GPA size to the GPA base.

Next, if the first address is within the range of addresses associated with the local I/O device, then in block 410, the access is forwarded to the local I/O device. As an example forwarding includes translating the first address to a second address based at least in part on a base address. Specifically, an offset of a GPA from a stored base GPA is taken. The offset is added to a stored base HPA to establish the translated HPA.

However, if the first address is not within the range of addresses associated with the local I/O device, then in block 415, the access is forwarded upstream toward primary translation logic, also referred to as a primary DMA remapping engine, which may be in a chipset or between I/O devices and system memory. Furthermore, if the GPA does not reference an addresses associated with any peer I/O device, but rather, is meant to access system memory, then when the primary translation logic receives the access, the GPA is translated to an HPA to access system memory. Additionally, if the GPA is an invalid GPA, then the it may be filtered by the primary translation logic.

Figure 5:
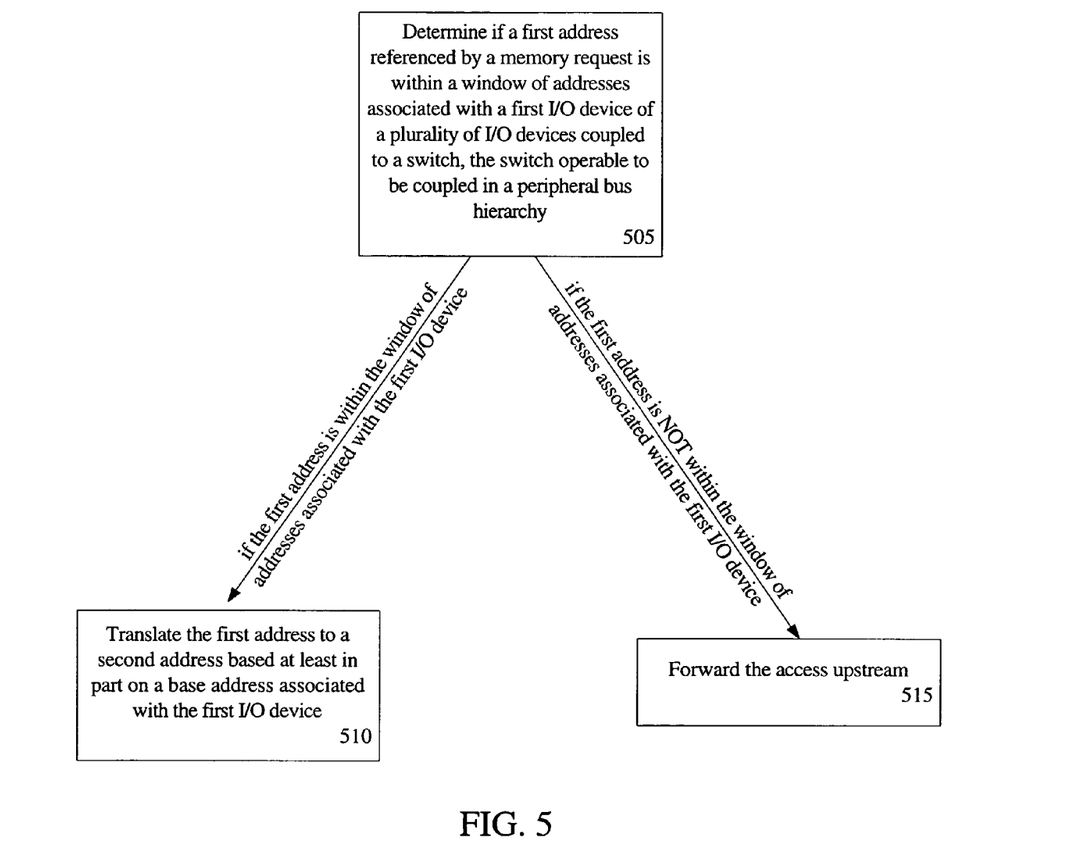
FIG. 5 illustrates another embodiment of a method for supporting direct memory accesses between peer I/O devices.

Turning to FIG. 5, another embodiment of a method for supporting direct memory accesses between peer I/O devices is illustrated. In block 505, it is determined if a first address referenced by a memory request is within a window of addresses associated with a first I/O device of a plurality of I/O devices coupled to a switch, the switch operable to be coupled in a peripheral bus hierarchy. As discussed above the peripheral bus may be a PCI, PCI-X, or other bus for connecting input/output devices, such as a universal serial bus (USB), a serial ATA bus, or a common standard interface (CSI) bus.

Next, in block 510 if the first address is within the range of addresses associated with the first I/O device, the first address is translated to a second address based at least in part on a base address associated with the first I/O device. However, in block 515, if the first address is not within the range of addresses associated with the first I/O device, then the memory request is forwarded upstream. From the discussion above, the same determination of whether a GPA is within a window of GPA's associated with a first I/O device may be used, as well as the same translation methods.

In addition, for all of the apparatuses and methods described herein, translation is not limited to a barebones offset translation. A hierarchal translation or other commonly used translation method for translating between virtual memory addresses and physical memory addresses or guest addresses and host addresses may be used.

As can be seen from above, the apparatus and method described for supporting peer-to-peer direct memory accesses potentially increase the speed at which peer-to-peer transfers occur. Instead of blindly forward upstream all accesses, as in the prior art, which may result in deadlock and long access times, because of the full upstream and downstream routing, a peer-to-peer access is enabled.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
receiving a request from a first local I/O device, which references a first address within a range of addresses associated with a second local I/O device;
determining if the second local I/O device is trusted in regards to the first local I/O device;
enabling peer-to-peer forwarding logic within a bridge coupled to the first and the second local I/O devices to forward the request to the second local I/O device without forwarding the request upstream in response to the second local I/O device being trusted in regards to the first local I/O device; and
disabling the peer-to-peer forwarding logic, such that the request from the first local I/O device is not to be forwarded to the second local I/O device, in response to the second local I/O device not being trusted in regards to the first local I/O device, wherein when the peer-to-peer forwarding logic is disabled the request is forwarded upstream, wherein the peer-to-peer forwarding logic within the bridge comprises:
upstream logic to associate a window or range of guest addresses for each I/O device coupled to the bridge;
downstream logic to associate a range or window of host addresses with each I/O device coupled to the bridge;
remapping logic to translate between the guest addresses of the upstream logic and the host addresses of the downstream logic, wherein the upstream logic includes at least one register to store a source identifier to identify a source of an address, a guest address base to establish a base for an associated window of guest addresses, a size of the associated window of guest addresses, and a base for an hosted host address and wherein the upstream logic is written to upon initialization to establish stored values such as source identification, base address, and size.

2. The method of claim 1, wherein each of the first I/O device and the second local I/O device is selected from a group consisting of a network interface controller (NIC), an audio device, a video device, a storage device, a peripheral component interconnect (PCI) device, a PCI switch, a PCI bridge, a controller hub, a peripheral component interconnect express (PCI-X) device, a PCI-X bridge, and a PCI-X switch.

3. The method of claim 1, further comprising:
determining the range associated with the second local I/O device by adding a size to a base address associated with the second local I/O device;
determining the first address is within the determined range.

4. The method of claim 3, wherein the first address is a first device virtual address (DVA), and wherein the base address references a base device virtual address, and wherein determining if the second local I/O device is trusted in regards to the first local I/O device comprises a software entity, when executed, determining if the second local I/O device is trusted in regards to the first local I/O device, the software entity being selected from a group consisting of a Virtual Machine Monitor (VMM), a Virtual Machine (VM), and an Operating System (OS).

5. The method of claim 4, further comprising forwarding the request to the second local I/O device, wherein forwarding the request to the second local I/O device comprises translating the first device virtual address to a first host physical address associated with the second local I/O device based at least in part on the first device virtual address, the base device virtual address, and a base host address.

6. The method of claim 5, wherein translating the first device virtual address to a first host physical address associated with the second local I/O device based at least in part on the first device virtual address, the base device virtual address, and the base host address comprises determining an offset of the first device virtual address from the base device virtual address and adding the offset to the base host address.

7. The method of claim 1, wherein determining if the second local I/O device is trusted in regards to the first local I/O device comprises:
determining the second local I/O device is trusted in response to the second local I/O device being associated with a domain that is also associated with the first local I/O device, and
determining the second local I/O device is not trusted in response to the second local I/O device not being associated with a domain that is also associated with the first local I/O device.

8. A computer system comprising:
a root hub coupled to a processor and memory, the root hub having primary translation logic to translate between guest physical addresses (GPAs) and host physical addresses (HPAs);
at least one bridge coupled to the root hub through an interconnect;
peer-to-peer logic in the bridge, when enabled, to determine if an access from a first I/O device coupled to the bridge referencing a first GPA is within a range of GPAs associated with a second I/O device coupled to the bridge, and to translate the first GPA to a first HPA without forwarding the access to the root hub, in response to the first GPA being within the range of GPAs associated with the second I/O device, and wherein the peer-to-peer logic in the bridge is to be disabled in response to determining the access referencing the first GPA is not trusted by the second I/O device and wherein the peer-to-peer logic, when disabled, is to blindly forward the access referencing the first GPA upstream toward the root hub, wherein the peer-to-peer logic includes at least one register to store a source identifier to identify a source of an address, a guest address base to establish a base for an associated range of guest addresses, a size of the associated range of guest addresses, and a base for an hosted host address and wherein the peer-to-peer logic is written to upon initialization to establish stored values such as source identification, base address, and size.

9. The computer system of claim 8, wherein the processor is to execute a virtual machine monitor (VMM), the VMM to interface with a plurality of virtual machines (VMs), each virtual machine to be logically associated with a portion of the memory, and wherein determining the access referencing the first GPA is not trusted by the second I/O device comprises determining the first and the second I/O devices are not logically associated with the same VM of the plurality of VMs.

10. The computer system of claim 9 wherein each of the virtual machines are selected from a group consisting of an operating system (OS), a group of related applications, a group of related drivers, a group of related code, a software application, and a program, and wherein the root hub is selected from a group consisting of a memory controller hub, a root controller hub, an input/output controller hub, an interconnect controller hub, a north-bridge, and a south bridge.

11. The computer system of claim 9, wherein the VMM is operable to determine if the second I/O device is trusted in relation to the first I/O device, enable the peer-to-peer logic in the bridge, in response to determining that the second I/O device is trusted in relation to the first I/O device, and disable the peer-to-peer logic in the bridge, in response to determining that the second I/O device is not trusted in relation to the first I/O device.

12. The computer system of claim 8, wherein the bridge is selected from a group consisting of a second controller hub, a peripheral component interconnect (PCI) bridge, peripheral component interconnect express (PCI-X) bridge, PCI switch, a PCI-X switch, and a software bridge.

13. The computer system of claim 8, wherein each of the first and second I/O devices is selected from a group consisting of a network interface controller (NIC), an audio device, a video device, a storage device, a peripheral component interconnect (PCI) device, a PCI switch, a PCI bridge, a peripheral component interconnect express (PCI-X) device, a PCI-X bridge, and a PCI-X switch.

14. The computer system of claim 8, wherein determining if the access referencing the first GPA is within the range of GPAs associated with a second I/O device coupled to the bridge comprises:
determining a range associated with the second I/O device from a GPA base address and a GPA range size associated with the second I/O device; and
determining if the first GPA is within the range associated with the second I/O device.

15. The computer system of claim 14, wherein translating the first GPA to the first HPA comprises adding an offset of the first GPA from a GPA base to an HPA base to obtain the first HPA.

* * * * *